United States Patent [19]

Naito

[11] Patent Number: 4,680,657
[45] Date of Patent: Jul. 14, 1987

[54] METHOD AND APPARATUS FOR REPRODUCING MAGNETICALLY RECORDED SIGNALS WITH A D.C. BIASING MAGNETIC FIELD PRODUCED BY A D.C. BIASING COIL

[75] Inventor: Hiroichi Naito, Kaisei, Japan

[73] Assignee: Fuji Photo Film Co., Ltd., Japan

[21] Appl. No.: 773,067

[22] Filed: Sep. 5, 1985

[30] Foreign Application Priority Data

Sep. 7, 1984 [JP] Japan .................. 59-187359

[51] Int. Cl.⁴ .................. G11B 5/335; G11B 5/09
[52] U.S. Cl. .................. 360/111; 360/66
[58] Field of Search .................. 360/66, 55, 46, 111, 360/112; 324/228, 233

[56] References Cited

U.S. PATENT DOCUMENTS

| | | | |
|---|---|---|---|
| 2,722,569 | 11/1955 | Loper | 360/111 |
| 2,999,135 | 9/1961 | Wiegand | 360/111 |
| 3,182,300 | 5/1965 | Lemke | 360/111 |
| 3,428,761 | 2/1969 | Webb | 360/111 |
| 3,444,332 | 5/1969 | Brown, Jr. | 360/111 |
| 3,629,520 | 12/1971 | Schwee | 360/111 |

*Primary Examiner*—Raymond F. Cardillo
*Assistant Examiner*—Alyssa H. Bowler
*Attorney, Agent, or Firm*—Pasquale A. Razzano

[57] ABSTRACT

A magnetically recorded signal on a magnetic recording medium is reproduced in response to a magnetic field produced thereby by applying a DC biasing magnetic field along the magnetic path of the core of a coil-supporting magnetic head, and adding a high-frequency magnetic field of a small amplitude to the DC biasing magnetic field. The DC biasing magnetic field is produced by passing a DC biasing current through a DC biasing coil on the core, and the high-frequency magnetic field is produced by passing a high-frequency current through another coil on the core.

3 Claims, 7 Drawing Figures

METHOD AND APPARATUS FOR REPRODUCING MAGNETICALLY RECORDED SIGNALS WITH A D.C. BIASING MAGNETIC FIELD PRODUCED BY A D.C. BIASING COIL

BACKGROUND OF THE INVENTION

1. Field of the invention

The present invention relates to a method of and an apparatus for reproducing signals recorded on a magnetic recording medium, and more particularly to a method of and an apparatus for reproducing magnetically recorded signals by employing a ring-shaped head made of a metallic magnetic material such as sendust, permalloy, amorphous material, or the like as a field-responsive playback head in longitudinal magnetization recording, or by employing such a ring-shaped head, a secondary magnetic excitation pole of the metallic magnetic material, or a primary magnetic excitation pole of the metallic magnetic material as a field-responsive playback head in perpendicular magnetization recording.

2. Description of the Prior Art

Various efforts have been made to accomplish higher packing densities on magnetic recording mediums. In magnetically recording signals with higher packing densities, it is preferable to lower the relative speed of movement between the recording medium and the magnetic head. Where magnetically recorded signals, particularly digital signals, are reproduced by a magnetic-induction-type playback head, the level of the reproduced signals is directly proportional to the speed of travel of the recording medium with respect to the magnetic head. Therefore, so long as the magnetic-induction-type playback head is employed, the relative speed of movement between the recording medium and the magnetic head cannot be reduced beyond a certain speed, resulting in a limitation on packing densities. In view of the difficulty of the magnetic-induction-type playback head, the tendency in high packing density magnetic recording is toward the use of a field-responsive magnetic head capable of generating reproduced signals at a level which is in direct proportion to the level of the magnetic field induced by the recorded signals irrespectively of the relative speed between the recording medium and the head and the track width.

One typical field-responsive head is a magneto-resistive-effect head (hereinafter referred to as an "MR head"). Since the MR head has been designed solely as a playback head, it has been manufactured independently of bulk heads or thin-film heads for magnetic recording. The fabrication of the MR head has required a complex process such as photolithography or other microscopic pattern formation techniques, and hence has resulted in increased cost. Another problem is that the signals reproduced by the MR head are subject to variations in voltage due to temperature changes.

SUMMARY OF THE INVENTION

In view of the problems with the conventional field-responsive signal reproduction, it is an object of the present invention to provide a method of and an apparatus for reproducing magnetically recorded signals with a field-responsive head of a metallic magnetic material supporting a coil or coils, which head can also be used for recording signals.

According to the present invention, a magnetically recorded signal on a magnetic recording medium is reproduced in response to a magnetic field produced thereby by applying a DC biasing magnetic field along the magnetic path of the core of a coil-supporting magnetic head, and adding a high-frequency magnetic field of a small amplitude to the DC biasing magnetic field.

An apparatus for carrying out such a signal reproducing method includes a magnetic head composed of a core having a magnetic path, a DC biasing coil mounted on the core for applying a DC biasing magnetic field along the magnetic path to the magnetic recording medium, a signal detecting coil mounted on the core for detecting the magnetically recorded signal on the magnetic recording medium, an output resistor having a resistance greater than the absolute value of the impedance of the head, a carrier oscillator connected through the output resistor to the signal detecting coil for enabling the signal detecting coil to add a high-frequency magnetic field to the DC biasing coil, and a detector for detecting an output signal produced from the signal detecting coil.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

When a DC biasing magnetic field (H bias) is applied along the direction of a magnetic path in the core of a magnetic head, and a small-amplitude high-frequency magnetic field (H carr) (hereinafter referred to as a "carrier") is added to the DC biasing magnetic field, then the impedance Z head of the magnetic head is expressed as follows:

$$Z\ head(\omega c, H\ bias) = R\ head(\omega c, H\ bias) + j\omega c\ L(\omega c, H\ bias) \quad (1)$$

where
  $\omega c$: carrier angular frequency (hereinafter referred to as "carrier frequency"); and
  H bias: magnitude of the DC biasing magnetic field.

The impedance due to coil stray capacitance is omitted since it is negligibly small.

Figure 1:
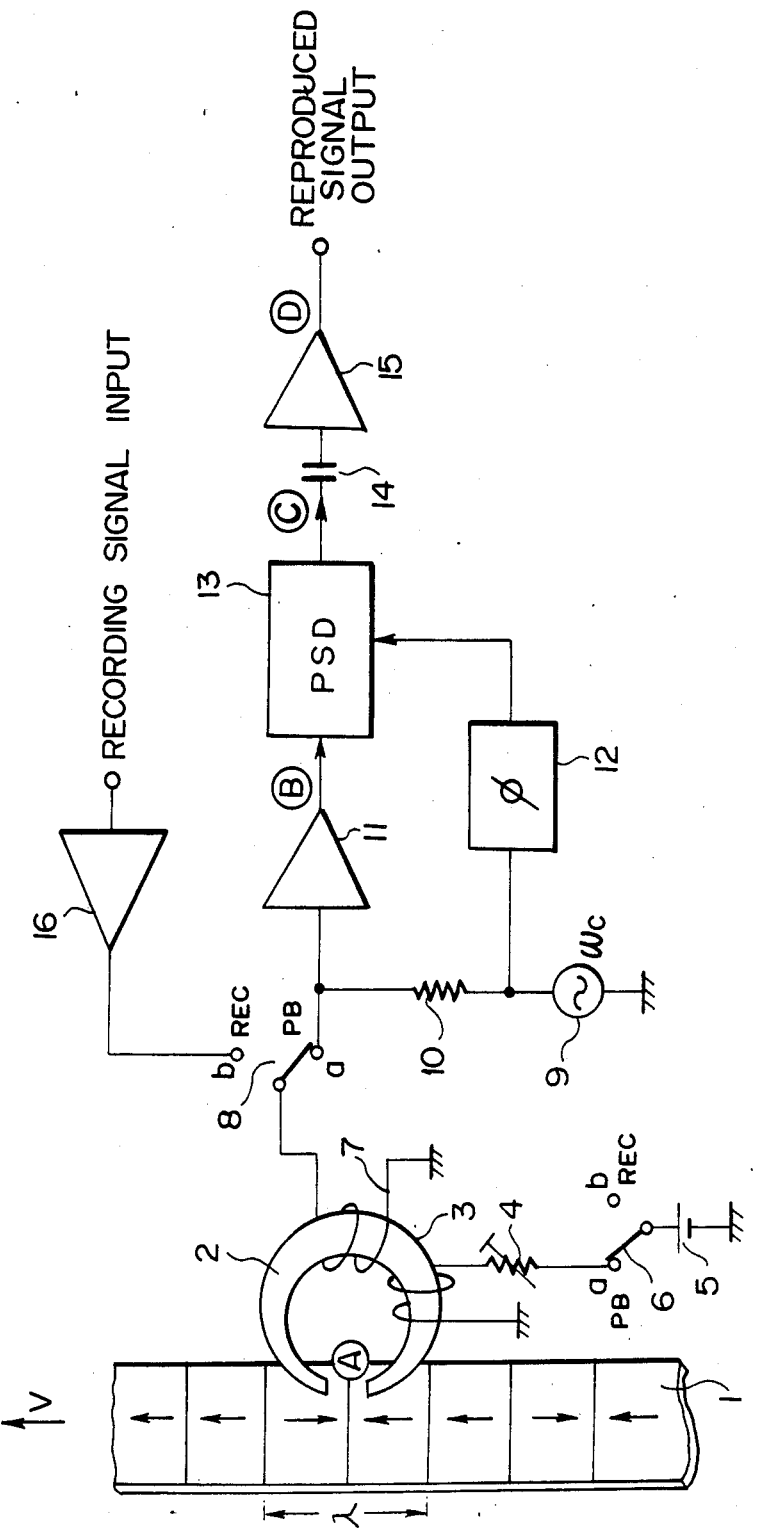
FIG. 1 is a block diagram of a recording and reproducing electronic circuit employed to carry out a method according to the present invention.

The equation (1) indicates that the head impedance is composed of a resistance, expressed by a real number, and an inductance, expressed by an imaginary number, and the magnitude of the inductance depends on the carrier frequency $\omega c$ and the magnitude of the DC biasing magnetic field H bias. The resistance R head ($\omega c$, H bias) in the equation (1) is given by the following equation:

$$R\ head(\omega c, H\ bias) = \mu''(\omega c, H\ bias)\cdot\omega c\cdot N^2(S/l) + Rdc \qquad (2)$$

where $\mu''$ ($\omega c$, H bias): imaginary part of the AC complex magnetic permeability of the head core, the imaginary part being greater as the eddy-current loss of the core becomes larger;

N: number of turns of a signal detecting and recording coil 7 (FIG. 1);

S: cross-sectional area of the head core;

l: length of the magnetic path of the head core; and

Rdc: DC resistance of the coil 7.

The equation (2) shows that the resistance or real part of the head impedance is increased as the carrier frequency $\omega c$ goes higher, and when $\omega c = 0$ [Hz], R head ($\omega c$, H bias) = Rdc.

Therefore, the real part of the head impedance is increased to an extent commensurate with the high-frequency loss of the head core. Where the head core is made of a metallic magnetic material, the high-frequency loss is mostly in the form of an eddy-current loss.

Figure 3:
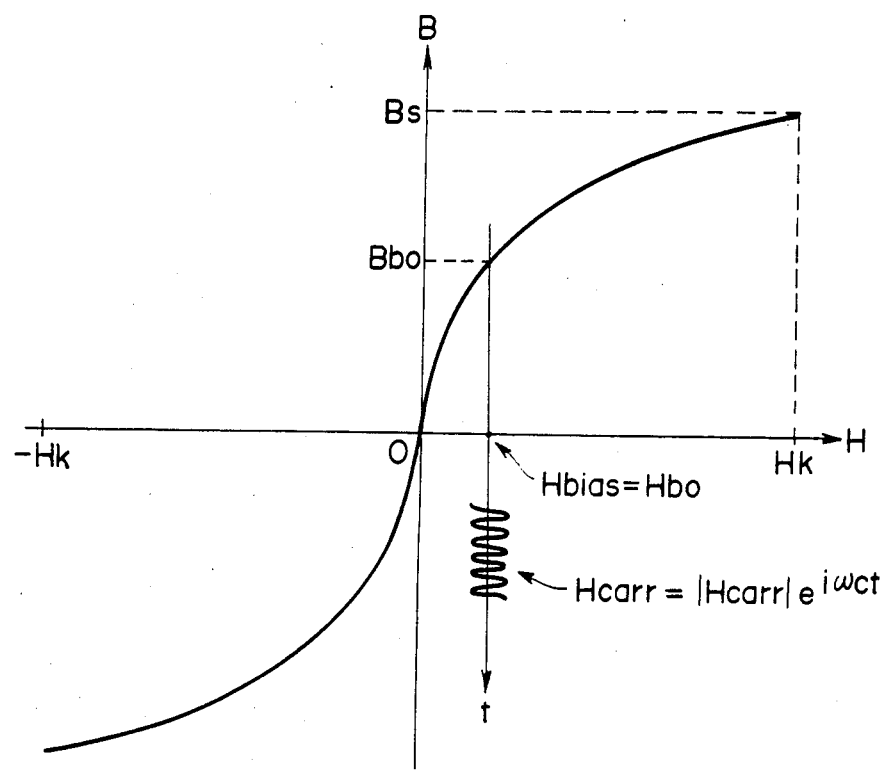
FIG. 3 is a diagram showing the B - H curve of a magnetic head core and a small-amplitude field carrier produced by applying a DC biasing magnetic field.

When the DC biasing magnetic field H bias is increased at a given carrier frequency $\omega c$ in the equation (2), the differentiated magnetic permeability of the core $\mu diff = dB/dH$ is reduced toward zero as is evidenced by the gradient of the B - H curve in FIG. 3 which approaches zero. Since the eddy-current loss is reduced as $\mu diff$ decreases, $\mu''$ ($\omega c$) is also reduced as H bias increases. As a result, the resistance or real part R head ($\omega c$, H bias) of the head impedance is reduced toward the DC coil resistance Rdc as the DC biasing magnetic field H bias increases at the given carrier frequency $\omega c$, as shown in FIG. 4.

Figure 4:
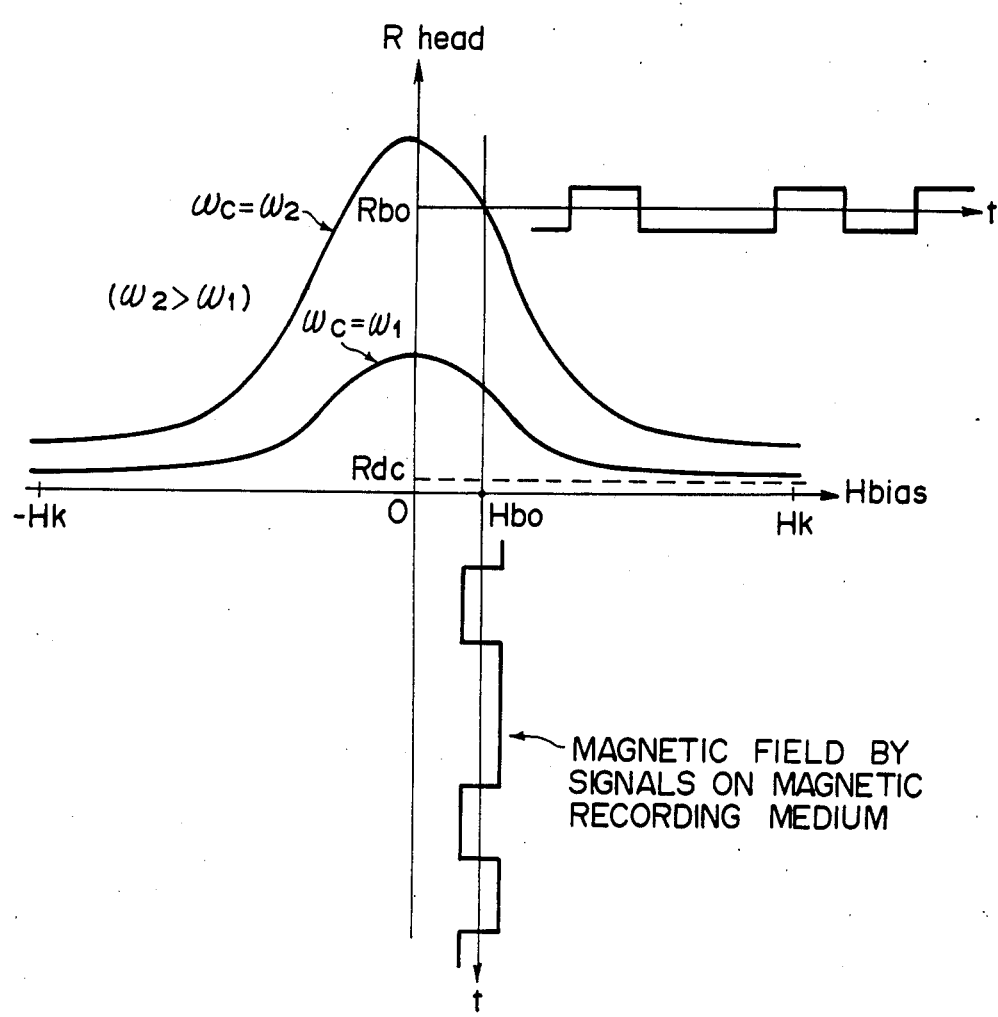
FIG. 4 is a diagram illustrating the relationship between the impedance due to a high-frequency loss and the biasing magnetic field of the magnetic head, with carrier frequencies used as a parameter.

FIG. 4 shows curves of the resistance R of the head impedance as plotted against the DC biasing magnetic field H bias. Based on the graph of FIG. 4, the following field-responsive signal reproducing method may be constructed:

First, the DC biasing magnetic field H bias is selected to be positioned on relatively steep and straight portions of the curves of FIG. 4, and the selected DC biasing magnetic field H bias is referred to as an optimum biasing field Hbo. At the optimum biasing field Hbo, the flux density of the core is B (H bias = Hbo) = Bbo. This flux density Bbo has to be of such a magnitude as to produce a magnetic field smaller than the minimum magnetic field capable of recording signals on the magnetic recording medium being used. This is because if the flux density Bbo should be greater than such a magnitude, the DC magnetic field would erase the signals recorded on the magnetic recording medium by way of DC erase. In actual heads of a metallic magnetic material, it is possible to select the optimum biasing field Hbo to be sufficiently small so as not to erase the recorded signals on the magnetic recording medium.

Where the DC biasing magnetic field H bias is selected to be the optimum DC biasing magnetic field Hbo in FIG. 4, and the carrier frequency $\omega c$ is fixed so as to be sufficiently higher than the frequencies of the signals recorded on the magnetic recording medium, the real part or resistance of the head impedance is R head (H bias = Hbo) = Rbo. When the magnetic field generated by the signals on the magnetic recording medium is added to the optimum DC biasing magnetic field, the head resistance R head varies above and below the level Rbo dependent on the signal magnetic field (ideally proportional thereto). By keeping constant the current of the carrier having the frequency $\omega c$ and flowing through the head coil 7 (FIG. 1) irrespectively of the absolute value of the head impedance, the variations of the head resistance R head due to the magnetic field of the signals can be detected as variations in the amplitude of a carrier voltage appearing across the head coil 7. Stated otherwise, the carrier of the frequency $\omega c$ is amplitude-modulated by the recorded signals on the magnetic recording medium, and the recording signals on the magnetic recording medium can be reproduced by detecting the amplitude-modulated carrier. The output voltage of the reproduced signals is consequently proportional to the magnitude of magnetization of the signals recorded on the magnetic recording medium, without depending on the speed of movement between the head and the magnetic recording medium and the track width on the magnetic recording medium. As a result, the recorded signals can be reproduced in a field-responsive manner.

Actually, as is apparent from the equation (1), the imaginary part or inductance of the head impedance is also varied by the magnetization by the recorded signals on the magnetic recording medium, and the carrier is amplitude-modulated by the inductance variation. If such an inductance-induced amplitude modulation should be detected and mixed in the proper reproduced signal detected only by the resistance or real part of the head impedance, then noise would be produced. Therefore, any amplitude modulation caused by the inductance variations should be removed. The removal of such inductance-induced amplitude modulation can be achieved by a phase-sensitive detector (PSD), for example. More specifically, the carrier amplitude-modulated by the resistance of the head impedance has the same carrier frequency as that of the carrier amplitude-modulated by the inductance of the head impedance, but leads the carrier amplitude-modulated by the inductance of the head impedance by a phase angle of 90°. Therefore, by employing a PSD reference signal which is equal in frequency and phase to the carrier amplitude-modulated by the resistance or real part of the head impedance, only the signal amplitude-modulated by the resistance of the head impedance can be detected and produced as the output signal of the phase-sensitive detector.

The high-frequency carrier current flows through the coil 7 (FIG. 1) at all times during signal reproduction. The magnetization by the recorded signals on the magnetic recording medium should not be erased by the high-frequency magnetic field generated from the head by the high-frequency carrier current. In reality, the magnetization on the magnetic recording medium is not erased for the following two reasons:

(1) As shown in FIG. 3, the amplitude |H carr| of the high-frequency magnetic field generated by the carrier current flowing through the coil 7 is selected to be sufficiently smaller than the optimum DC biasing magnetic field Hbo which is established by a coil 3 (FIG. 1). As the DC biasing magnetic field Hbo is so weak as not to erase the signal magnetization on the magnetic recording medium, the amplitude of the high-frequency magnetic field produced by the carrier current is much smaller than the minimum magnetic field necessary to erase the signal magnetization on the magnetic recording medium (|H carr | < <Hbo). Therefore, there is no danger of signal erasure.

(2) The carrier frequency is selected to be sufficiently higher than the frequencies of the signals recorded on the magnetic recording medium (for example, ωc/2 in the range of from 20 MHz to 50 MHz). The high carrier frequency causes the head of metallic magnetic material to suffer an eddy-current loss which lowers the AC magnetic permeability $\mu'$ of the head core (or lowers the head efficiency). Therefore, the high-frequency magnetic field produced from the head by the high-frequency carrier current flowing through the coil 7 is sufficiently small in intensity and does not erase the signals on the magnetic recording medium.

During signal reproduction, the signals recorded on the magnetic recording medium are also reproduced in the ordinary magnetic induction process to produce a signal voltage across the coil 7. Although the signal voltage generated by the magnetic induction process is small on account of the low speed of relative movement between the head and the magnetic recording medium in the field-responsive signal reproducing system, any such voltage signal is responsible for creating noise with respect to the normal reproduced signal on the carrier.

The noise induced by the ordinary magnetic induction process is eliminated as follows: While the recorded signals are reproduced, the signal voltage across the coil 7 is applied to the phase-sensitive detector. The phase-sensitive detector produces only a detected output signal having the same frequency and phase as the frequency ωc and the phase of the carrier used as the reference signal of the phase-sensitive detector. Because the frequencies of the signals reproduced by the magnetic induction process are equal to the frequencies of the recorded signals on the magnetic recording medium and sufficiently lower than the carrier frequency, i.e., the reference signal frequency, the phase-sensitive detector does not produce as its output signal any information of the signals reproduced by the magnetic induction process.

The carrier frequency ωc should be as high as possible for the following two reasons:

(1) The sensitivity of the field-responsive signal reproducing system according to the present invention is greater as the carrier frequency ωc is higher, as can be understood from the equation (2) and FIG. 4.

(2) The higher the carrier frequency ωc compared with the frequencies of the signals recorded on the magnetic recording medium, the better the accuracy of the detection employing the phase-sensitive detector.

However, a suitable carrier frequency should be determined since the higher the carrier frequency ωc, the greater difficulty the electronic circuit (described later) of FIG. 1 experiences in achieving its normal operation.

The sensitivity and dynamic range in the signal reproducing method of the present invention will now be described especially for their relationship to the requirements to be met by a head employed in the method of the present invention.

Sensitivity:

The relationship between the head characteristics and sensitivity is expressed by the equation (2). The head characteristics are roughly divided into geometric characteristics such as the cross-sectional area of the head core, the length of the magnetic path, and the number of coil turns, and magnetic and electric properties of the head core. The sensitivity is proportional to the square of the number of coil turns, proportional to the cross-sectional area of the head core (and hence the thickness thereof), and inversely proportional to the length of the magnetic path. The sensitivity is also proportional to the imaginary part $\mu''$ of the AC complex magnetic permeability of the head core. If the magnetic core is made of a metallic magnetic material, then the imaginary part $\mu''$ almost entirely depends on the eddy-current loss, and increases as the eddy-current loss increases. As is well known, the eddy-current loss is proportional to the DC magnetic permeability $\mu dc$ of the magnetic material of the head core, and inversely proportional to its resistivity $\rho$. Because of the skin effect, the thinner the magnetic head core, the greater the eddy-current loss thereof. As the carrier frequency ωc in the method of the invention becomes higher, the eddy-current loss increases substantially in proportion thereto. The eddy-current loss coefficient $e_1$ of the head core should range from $0.1 \times 10^{-6}$ to $0.3 \times 10^{-6}$ [Hz$^{-1}$].

Dynamic range:

As illustrated in FIGS. 3 and 4, the dynamic range is wider as the optimum DC biasing magnetic field Hbo is larger, provided that the flux density Bbo of the head core at the time the optimum DC biasing magnetic field is applied to the head core is sufficiently small so as not to erase the recorded signals on the magnetic recording medium by way of DC erase, a feature which depends on the static magnetic characteristics of the head core (FIG. 3).

As described above, the various characteristics (such as the number of coil turns, the thickness of the head core, the magnetic and electric properties of the core head, for example) of the magnetic head used in the method of the present invention should appropriately be selected in order to provide a practical sensitivity and dynamic range.

If the head of the present invention is used for reproducing signals in a field-responsive mode and also for recording signals, as shown in FIG. 1 (described later on), then the head should have a good recording sensitivity throughout the frequency range of signals to be recorded. The recording sensitivity becomes lower in a higher-frequency range as the eddy-current loss is larger, which is incompatible with the fact that the reproducing sensitivity according to the method of the invention is higher as the eddy-current loss is larger. As a result, the thickness of the head core and the magnetic and electric properties of the head core should be selected so that both recording and reproducing sensitivities of the head will be of practical values.

The preferable AC magnetic permeability $\mu'$ of the head used in the method of the invention should be as high as possible in a low-frequency range and should become lowered as sharply as possible as the frequency goes higher.

The head which meets the foregoing requirements and has a practical sensitivity and dynamic range in both reproducing and recording modes may be a recently available head of metallic magnetic material such as a bulk video head of sendust, amorphous material, or the like. The method of the present invention is not suitable for use with a head which has had its eddy-current loss highly reduced by reducing the core thickness, such as a thin-film magnetic head, a laminated head, or the like.

An electronic circuit arrangement for carrying out the recording and reproducing process of the present invention will be described with reference to FIGS. 1 and 2A through 2D.

For recording signals, mode changeover switches 6, 8 which are ganged to each other are operated to select the recording mode. Then, no current flows through a DC biasing coil 3 of a ring-shaped and coil-supporting magnetic head 2 having a core of a metallic magnetic material disposed over a magnetic recording medium 1, and a coil 7 of the magnetic head 2 is connected to the output terminal of a recording amplifier 16. The circuit of FIG. 1 now operates as an ordinary recording system.

When reproducing recorded signals on the magnetic recording medium 1, the mode changeover switches 6, 8 are shifted to a playback mode to connect the DC biasing coil 3 to a DC biasing power supply 5. The optimum DC biasing magnetic field Hbo is selected by adjusting a rheostat 4. The coil 7 is connected to the output terminal of a signal-detecting carrier oscillator 9 through a resistor 10 the resistance of which is sufficiently larger than the absolute value of the impedance of the magnetic head 2. The carrier current flowing through the coil 7 is now rendered independent of variations in the head impedance. Therefore, the amplitude |H carr| of the carrier field added to the optimum DC biasing magnetic field is also independent of variations in the head impedance, with the result that the signal detecting accuracy is not lowered. The oscillator 9 is adjusted to select an optimum amplitude and frequency of the carrier field.

Figure 2A:
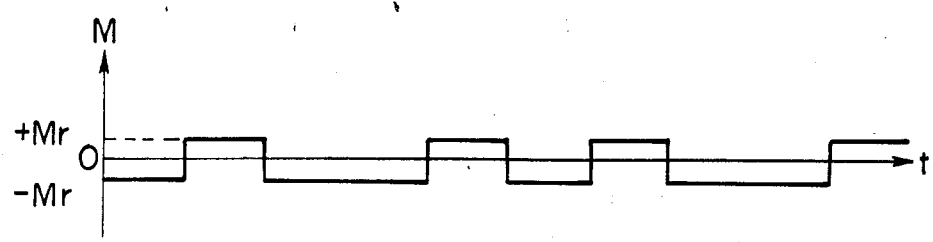
FIG. 2A is a diagram showing the waveform of magnetization by a signal recorded on a magnetic recording medium in the method of the present invention.
Figure 2B:
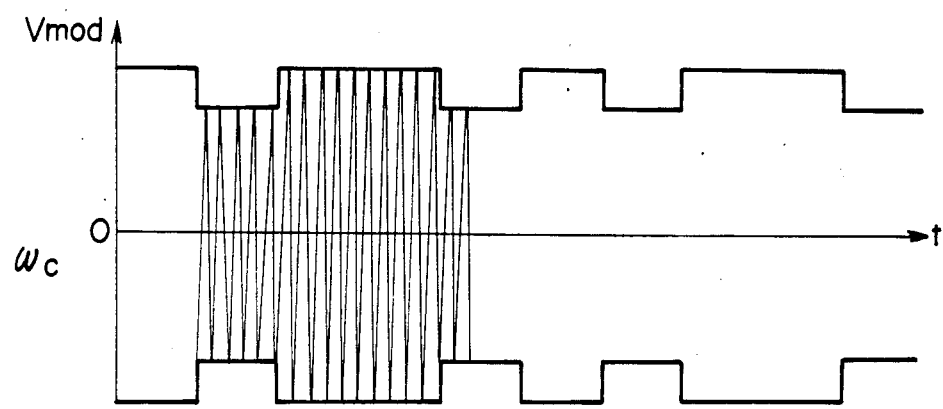
FIG. 2B is a diagram showing the waveform of a carrier having an angular frequency $\omega c$ amplitude-modulated by the signal on the magnetic recording medium.
Figure 2C:
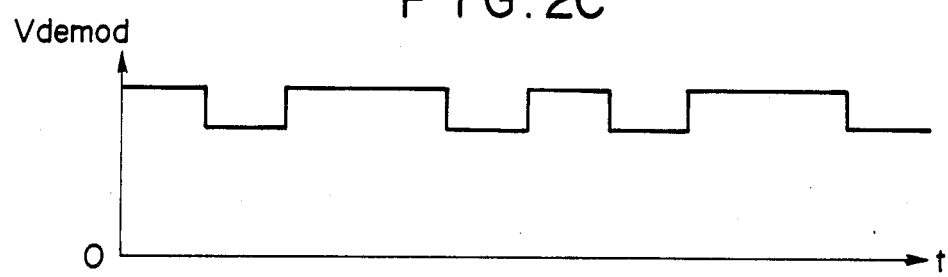
FIG. 2C is a diagram of the waveform of an output signal from a phase-sensitive detector.

A carrier signal voltage which is amplitude-modulated by the recorded signal (FIG. 2A) on the magnetic recording medium 2 is applied from the coil 7 to a band amplifier 11 which amplifies the voltage as shown in FIG. 2B. The amplified voltage is then applied to a phase-sensitive detector (PSD) 13.

The frequency band of the band amplifier 11 is required to have a central frequency equal to the carrier frequency $\omega c$ and a band width covering the frequency band of the signals recorded on the magnetic recording medium 1. A reference signal of the phase-sensitive detector 13 is produced by applying the carrier voltage from the oscillator 9 via a phase shifter 12 to the reference signal terminal of the phase-sensitive detector 13. The reference signal is shifted in phase by the phase shifter 12 to an extent corresponding to a phase shift caused by the band amplifier 11. The band amplifier 11 and the phase shifter 12 may be dispensed with if the amplitude of the amplitude-modulated carrier appearing across the terminals of the coil 7 is large enough to permit detection by the phase-sensitive detector.

The output terminal of the phase-sensitive detector 13 produces a reproduced signal voltage (FIG. 2C) detected by the phase-sensitive detector 13. The DC component is removed from the reproduced signal voltage by a DC blocking capacitor 14, and the signal passed through the DC blocking capacitor 14 is amplified by a playback amplifier 15 from which a reproduced signal (FIG. 2D) is output.

Figure 2D:
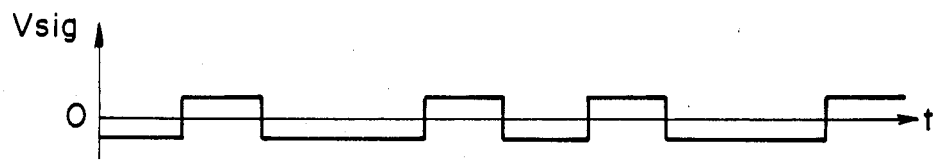
FIG. 2D is a diagram of the waveform of the reproduced signal output which is finally generated.

The signal magnetization (FIG. 2A) recorded on the magnetic recording medium 1 is therefore reproduced as the reproduced signal as illustrated in FIG. 2d.

According to the present invention, the field-responsive reproduction of magnetically recorded signals can be accomplished by using an ordinary bulk head made of a metallic magnetic material. Therefore, it is not necessary to use, as a field-responsive playback head, a magnetoresistive-effect head or the like which requires a complex fabrication process and operates less stably. As shown in FIG. 1, the field-responsive playback bulk head of metallic magnetic material can also be used for recording signals on the magnetic recording medium. Consequently, signals can be recorded and reproduced by the signal head, and the overall cost of the circuit arrangement can be lowered.

The method of the present invention can be utilized for recording and reproducing digital or analog signals, although it is of greater advantage when used for recording and reproducing digital signals.

The recording and reproducing system shown in FIG. 1 is illustrated by way of example only. Two heads designed respectively for recording and reproducing signals may be employed. In such a case, the playback head can be designed for better signal reproduction without being subject to various limitations imposed by the requirements for the recording head.

The coil 3 for applying the DC biasing magnetic field may be dispensed with, and a DC biasing current may electrically be added to a carrier current for being passed through the coil 7.

While a ring-shaped bulk head having a metallic magnetic core has been shown by way of illustrative example, other heads can be employed in the method of the present invention. Such other heads include, for example, a thin-film magnetic head having a metallic magnetic film of an increased thickness and a conductive coil of a reduced DC resistance, a perpendicular magnetic recording head having a primary magnetic excitation pole in the form of a metallic magnetic film having an increased thickness remotely from its surface for contact with the magnetic recording medium, and a perpendicular magnetic recording head having a secondary magnetic excitation pole in the form of a metallic magnetic bulk. The metallic magnetic material may be sendust, permalloy, amorphous material, or the like.

Although a certain preferred embodiment has been shown and described, it should be understood that many changes and modifications may be made therein without departing from the scope of the appended claims.

What is claimed is:

1. An apparatus for reproducing magnetically recorded signals contained in a magnetic recording medium, comprising:

a magnetic head with a resistance and an inductance, the resistance and the inductance defining an impedance, the magnetic head including a core having a magnetic path;

a D.C. biasing coil mounted on said core;

means for supplying D.C. current to said D.C. biasing coil;

a signal detecting coil mounted on said core;

carrier oscillator means for supplying A.C. current at a predetermined frequency to said signal detecting coil;

an output resistor with a resistance, the resistance of the output resistor being greater than the absolute value of the impedance of the magnetic head, the output resistor being electrically connected in series between said signal detecting coil and said carrier oscillator means;

a phase sensitive detector connected to said signal detecting coil, said output resistor being electrically connected in series between said detector and said carrier oscillator means; and means for delivering an electrical signal at said predetermined frequency from said carrier oscillator means to said phase sensitive detector, said electrical signal being in phase with an output signal from said signal detecting coil that is a function of the resistance of the magnetic head;

wherein said phase sensitive detector detects signals from said signal detecting coil that are in phase with the electrical signal from the signal delivering means; whereby an output signal from said signal detecting coil that is a function of the inductance of the magnetic head is undetected, thereby reducing noise.

2. An apparatus as recited in claim 1, wherein said core is a ring-shaped core made of a metallic magnetic material.

3. An apparatus as recited in claim 1, further comprising:

means for supplying a signal to be recorded to said signal detecting coil; and means for selectively switching said signal detecting coil between said recording signal supplying means and said carrier oscillator means.

* * * * *